United States Patent
Ventimiglia et al.

(10) Patent No.: US 9,591,556 B2
(45) Date of Patent: Mar. 7, 2017

(54) METHODS, SYSTEMS, AND COMPUTER READABLE MEDIA FOR ACCESS NETWORK DISCOVERY AND SELECTION

(71) Applicant: Tekelec, Inc., Morrisville, NC (US)

(72) Inventors: Mark Thomas Ventimiglia, Chicago, IL (US); Richard Cardone, Norton, MA (US); Uri Baniel, Buffalo Grove, IL (US); Sundaram Rajagopalan, Waltham, MA (US)

(73) Assignee: TEKELEC, INC., Morrisville, NC (US)

( * ) Notice: Subject to any disclaimer, the term of this patent is extended or adjusted under 35 U.S.C. 154(b) by 100 days.

(21) Appl. No.: 13/899,213

(22) Filed: May 21, 2013

(65) Prior Publication Data
US 2013/0310030 A1 Nov. 21, 2013

Related U.S. Application Data

(60) Provisional application No. 61/649,885, filed on May 21, 2012.

(51) Int. Cl.
*H04M 1/00* (2006.01)
*H04W 48/16* (2009.01)
(Continued)

(52) U.S. Cl.
CPC ......... *H04W 48/16* (2013.01); *H04L 12/1407* (2013.01); *H04L 12/5692* (2013.01);
(Continued)

(58) Field of Classification Search
CPC . H04W 48/16; H04W 48/18; H04W 28/0268; H04W 28/0289; H04W 28/08;
(Continued)

(56) References Cited

U.S. PATENT DOCUMENTS 7,516,198 B1 * 4/2009 Appala ............... H04L 45/02
707/999.004
9,241,285 B1 * 1/2016 Bertz .................. H04W 28/12
(Continued)

FOREIGN PATENT DOCUMENTS

WO WO 2010/037422 A1 4/2010
WO WO 2011/058395 A1 5/2011
(Continued)

OTHER PUBLICATIONS

Notification of the Transmittal of the International Search Report and the Written Opinion of the International Searching Authority, or the Declaration for PCT International Patent Application No. PCT/US2013/042052 (Jul. 1, 2013).
(Continued)

*Primary Examiner* — Olumide T Ajibade Akonai
(74) *Attorney, Agent, or Firm* — Jenkins, Wilson, Taylor & Hunt, P.A.

(57) ABSTRACT

Methods, systems, and computer readable media for access network discovery and selection are disclosed. According to one aspect, a system for access network discovery and selection includes an access network discovery and selection function (ANDSF) network element for identifying to a user equipment (UE) an access network through which the UE can connect to a core network, the ANDSF including an interface for communicating with nodes in a core network. The ANDSF is configured to receive information from a node in the core network and perform an access network discovery or selection operation based at least in part on the received information.

21 Claims, 3 Drawing Sheets

(51) Int. Cl.
*H04M 15/00* (2006.01)
*H04L 12/54* (2013.01)
*H04L 12/24* (2006.01)
*H04L 12/14* (2006.01)
*H04W 48/14* (2009.01)

(52) U.S. Cl.
CPC ...... *H04L 12/5695* (2013.01); *H04L 41/0893* (2013.01); *H04M 15/66* (2013.01); *H04W 48/14* (2013.01)

(58) Field of Classification Search
CPC ..... H04W 88/02; H04W 88/04; H04W 88/06; H04W 88/08; H04L 41/0893; H04L 12/5692; H04L 12/5695; H04L 12/1407; H04M 15/66
USPC ......................................................... 455/434
See application file for complete search history.

(56) References Cited

U.S. PATENT DOCUMENTS

| | | | |
|---|---|---|---|
| 2011/0022702 A1* | 1/2011 | Riley | H04L 12/14 709/224 |
| 2012/0281674 A1* | 11/2012 | Jackson | H04L 12/1403 370/331 |
| 2012/0302267 A1* | 11/2012 | Haines | H04L 12/2825 455/466 |
| 2012/0324100 A1* | 12/2012 | Tomici et al. | 709/224 |
| 2013/0070594 A1* | 3/2013 | Garcia Martin et al. | 370/235 |
| 2013/0182715 A1* | 7/2013 | Pandya | H04L 12/14 370/401 |
| 2014/0160994 A1* | 6/2014 | Garcia Martin et al. | 370/259 |

FOREIGN PATENT DOCUMENTS

| | | |
|---|---|---|
| WO | WO 2011/150986 A1 | 12/2011 |
| WO | WO 2012/055769 A1 | 5/2012 |
| WO | WO 2012/064055 A2 | 5/2012 |

OTHER PUBLICATIONS

3GPP, "Digital cellular telecommunications system (Phase 2+); Universal Mobile Telecommunications System (UMTS); LTE; Policy and Charging Control (PCC) over S9 reference point; Stage 3 (3GPP TS 29.215 version 9.6.0 Release 9)," 3GPP ETSI TS 129 215, V9.6.0 pp. 1-40 (Apr. 2011).

3GPP, "Network-Based Mobility Management in the Evolved 3GPP Core Network," IEEE Communications Magazine, pp. 58-66 (Feb. 2009).

3rd Generation Partnership Project, "Technical Specification Group Core Network and Terminals; Access to the 3GPP Evolved Packet Core (EPC) via non-3GPP access networks; Stage 3 (Release 11)," 3GPP TS 24.302, V11.5.0, pp. 1-61 (Dec. 2012).

Communication of European Publication Number and Information on the Application of Article 67(3) EPC for European Patent Application No. 13793297.6 (Mar. 18, 2015).

Extended European Search Report for European Patent Application No. 13793297.6 (Feb. 17, 2016).

Panasonic et al., "Interaction of ANDSF with enhanced policy framework," 3GPP TSG SA WG2 Meeting #81, SA WG2 Temporary Document, TD S2-104705, pp. 1-3 (Feb. 2010).

Panasonic, "Key issue on policy enhancement with terminal assistance," 3GPP TSG SA WG2 Meeting #78, SA WG2 Temporary Document, TD S2-101274, pp. 1-3 (Feb. 2010).

Alcatel-Lucent, "Information flow to the ANDSF for a Handover Decision," 3GPP TSG-SA Meeting #63, Change Request, S2-081357, pp. 1-3 (Feb. 18, 2008).

Alcatel-Lucent, "Policy based terminal triggered, ANDSF decided access selection," 3GPP TSG SA WG2 Architecture—S2#63, SA WG2 Temporary Document, S2-081658, pp. 1-6 (Feb. 2008).

Letter Regarding Office Action for Japanese Patent Application No. 2015-514120 (Jul. 12, 2016).

NEC et al., "Routing Policy Configuration Application Function," 3GPP TSG SA WG2 Meeting #78, SA WG2 Temporary Document, TD S2-101112, pp. 1-9 (Feb. 26, 2010).

* cited by examiner

METHODS, SYSTEMS, AND COMPUTER READABLE MEDIA FOR ACCESS NETWORK DISCOVERY AND SELECTION

PRIORITY CLAIM

This application claims the benefit of U.S. Provisional Patent Application Ser. No. 61/649,885, filed May 21, 2012; the disclosure of which is incorporated herein by reference in its entirety.

TECHNICAL FIELD

The subject matter described herein relates to methods and systems for enabling communication across a variety of networks and network types. More particularly, the subject matter described herein relates to methods, systems, and computer readable media for access network discovery and selection.

BACKGROUND

Many networks, such as telecommunications networks and data networks, may be conceptually divided into what is referred to as the core network and the access network. The core network is the central part of a telecommunication network that provides various services to customers who are connected by access networks. Core networks are typically wired or fiber optic networks and make up the structural and functional backbone of the network. Core networks are distinct from public data networks, such as the Internet, although core networks may include gateways by which the core network may communicate with public data networks. Access networks provide the interface between individual users and user equipment (UE) and the core network, and are thus considered to make up the topological periphery of a telecommunications or data network, since the function of the access network is, not surprisingly, to allow a UE to access the core network. Access networks often include a wireless component, such as the cellular phone radio interface for mobile phones, 802.11 variant wireless communication for Wi-Fi access points, and the like.

Mobile devices such as cellular telephones, smart phones, personal digital assistants, etc., may have the capability to communicate over multiple types of wireless networks. For example, a cell phone may be able to communicate over both a cellular network such as an LTE (long term evolution) network and a Wi-Fi or WiMAX network. Thus, at any particular geographical location, a cell phone or other UE may be within the vicinity of multiple access networks that could be used by the UE.

Figure 1:
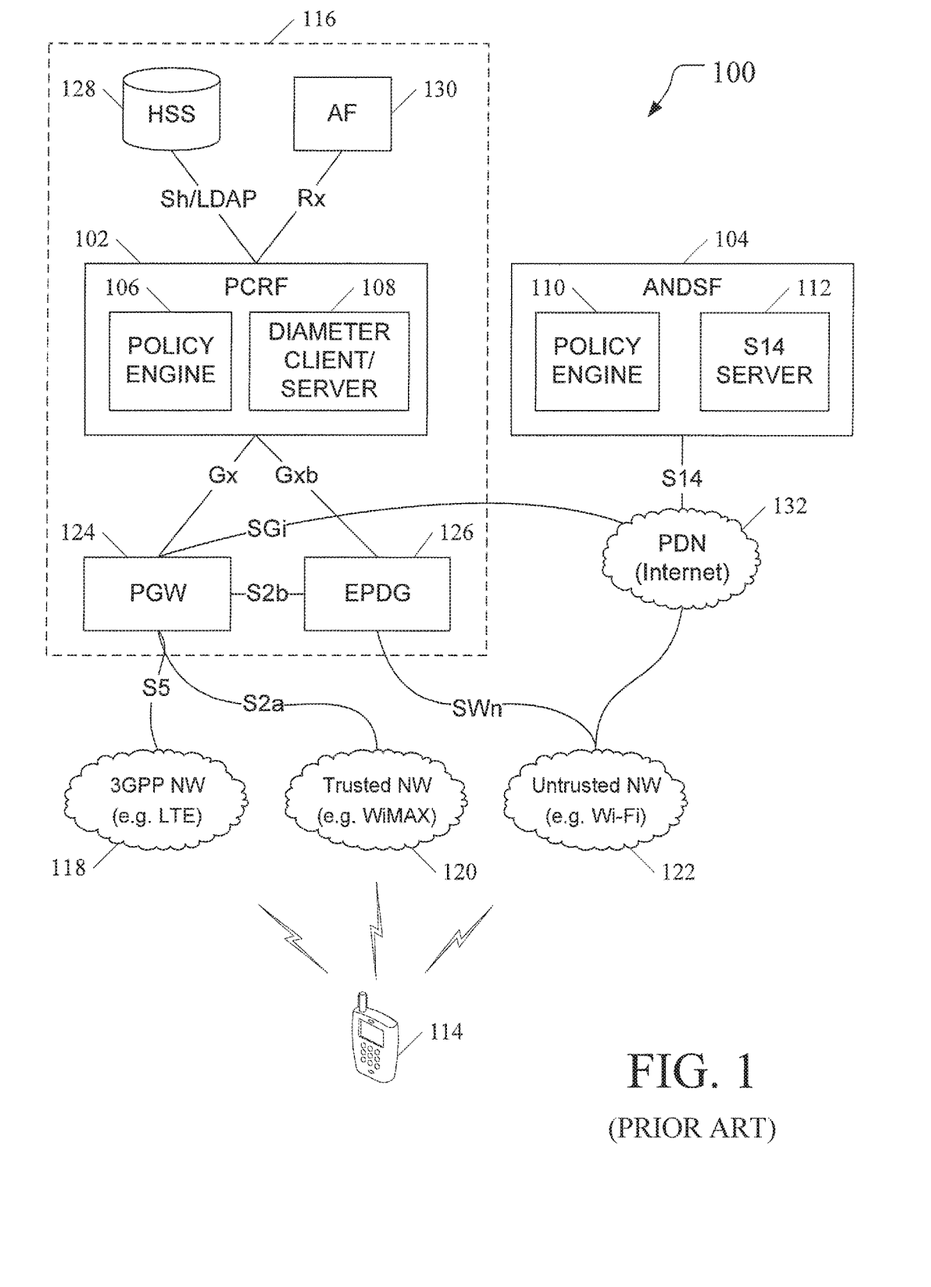
FIG. 1 is a network diagram illustrating a portion of a conventional telecommunications network.

FIG. 1 is a network diagram illustrating a portion of a conventional telecommunications network. Network 100 includes a policy and charging rules function (PCRF) 102 and an access network discovery and selection function (ANDSF) 104.

PCRF 102 encompasses policy control decision and flow based charging control functionalities. PCRF 102 provides network control regarding the QoS and flow based charging towards a gateway, such as a gateway between a core network and an access network. PCRF 102 includes a policy engine 106 making policy decisions in response to policy requests and for providing policy instructions to other nodes in the network. PCRF 102 typically includes a Diameter client and/or server 108 for communicating policy-related messages to other nodes via the Diameter protocol.

ANDSF 104 includes its own policy engine 110 as well as an S14 server 112 for communicating policy-related messages to a user equipment UE 114. ANDSF 104 helps UEs, such as UE 114, discover and select non-3GPP networks by providing information on the following:

(1) Available non-3GPP networks, including trusted networks, such as WiMAX, and untrusted networks, such as Wi-Fi networks, as well as information such as network name, security parameters, etc.

(2) Inter-system mobility policy (3GPP Rel-9), including network selection polices for UEs with a single active network connection, e.g., either 3GPP or Wi-Fi, but not both. Polices can be defined by location, coverage area, date and time, etc.

(3) Inter-system routing policy (3GPP Rel-10), including network selection policies for UE with simultaneous active network connections, e.g., 3GPP and Wi-Fi at the same time. Network selection can be done by session, flow, or service. UEs may use non-seamless access, multiple-access PDN connectivity (MAPCON), or IP flow mobility (IFOM).

ANDSF 104 is typically used for offloading calls or data sessions from a cellular telephone network onto a non-3GPP network such as Wi-Fi or WiMAX.

Network 100 also includes various access networks by which UE 114 may connect to a core network 116. In the embodiment illustrated in FIG. 1, network 100 is connected to a 3GPP access network, such as LTE network 118, a trusted access network, such as WiMAX network 120, an untrusted access network, such as Wi-Fi network 122.

A PDN gateway (PGW) 124 provides connectivity between core network 116 and UE 114 via 3GPP networks such as LTE network 118 and trusted networks such as WiMAX network 120. PGW 124 performs policy enforcement, packet filtering for each user, charging support, lawful interception and packet screening. PGW 124 communicates with LTE network 118 via the S5 interface, and communicates with WiMAX network 120 via the S2a interface. PGW 124 communicates with PCRF 102 via the Gx interface.

An evolved packet data gateway (ePDG) 126 provides secure data transmission between UE 114 and core network 116 over an untrusted non-3GPP access network, such as Wi-Fi network 122. ePDG 126 communicates with Wi-Fi network 122 via the SWn interface. ePDG 126 communicates with PCRF 102 via the Gxb interface. PGW 124 and ePDG 126 may communicate with each other via the S2b interface.

A home subscriber server (HSS) 128 is a repository for subscriber profile information, and may communicate with PCRF 102 using the Sh interface, via LDAP, or via other protocols which support database queries.

An application function (AF) 130 provides services to the network, and may communicate with PCRF 102 via an Rx interface.

In the example shown in FIG. 1, ANDSF 104 is part of a packet data network (PDN) 132, such as the Internet, and supports the S14 interface, with which ANDSF 104 can communicate with UEs, such as UE 114. PGW 124 also connects to PDN 132 via a SGi interface. PDN 132 is also connected to Wi-Fi network 122.

There are disadvantages associated with conventional ANDSFs such as ANDSF 104. While conventional ANDSF 104 can provide UE 114 with information about available access networks 118, 120, and 122, and optionally instruct UE 114 to connect to one of the available networks, conventional ANDSF 104 has no access to information available within core network 116. In particular, although ANDSF 104 may have its own policy engine 110, ANDSF 104 has no connection to PCRF 102 or any other policy and charging function through which it might receive policy information from core network 116, and thus cannot consider core network policy when identifying and/or selecting access networks. Moreover, conventional ANDSF 104 has no access to other core network elements, such as HSS 128, AF 130, gateways 124 and 126, traffic detection functions, and the like. As a result, ANDSF 104 can make only simplistic decisions about call offloading. ANDSF 104 can implement only simple, static policies and cannot implement dynamic policies based on variables such as current network load or unavailability of nodes on the network due to maintenance, for example.

It is desired to have an ANDSF with enhanced capabilities, such as the ability to coordinate with nodes within a core network, such as PCRFs, HSSs, gateways, application functions, and traffic detection functions, to make more intelligent decisions about call offloading. Additionally, an enhanced ANDSF would be uniquely situated to allow communication between a UE and a PCRF in a manner not supported in any current networking standards. Accordingly, in light of these difficulties associated with conventional ANDSF, there exists a need for methods, systems, and computer readable media for access network discovery and selection.

SUMMARY

According to one aspect, the subject matter described herein includes a system for access network discovery and selection. The system includes selection function (ANDSF) network element for identifying to a user equipment (UE) an access network through which the UE can connect to a core network, the ANDSF including an interface for communicating with nodes in a core network. The ANDSF is configured to receive information from a node in the core network and perform an access network discovery or selection operation based at least in part on the received information.

According to another aspect, the subject matter described herein includes a method for access network discovery and selection. The method includes, at an access network discovery and selection function (ANDSF) for identifying to a user equipment (UE) an access network through which the UE can connect to a core network, the ANDSF including an interface for communicating with nodes in a core network: receiving information from a node in the core network and performing an access network discovery or selection function based at least in part on the received information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media for access network discovery and selection are provided. Reference will now be made in detail to exemplary embodiments of the present invention, examples of which are illustrated in the accompanying drawings. Wherever possible, the same reference numbers will be used throughout the drawings to refer to the same or like parts.

Figure 2:
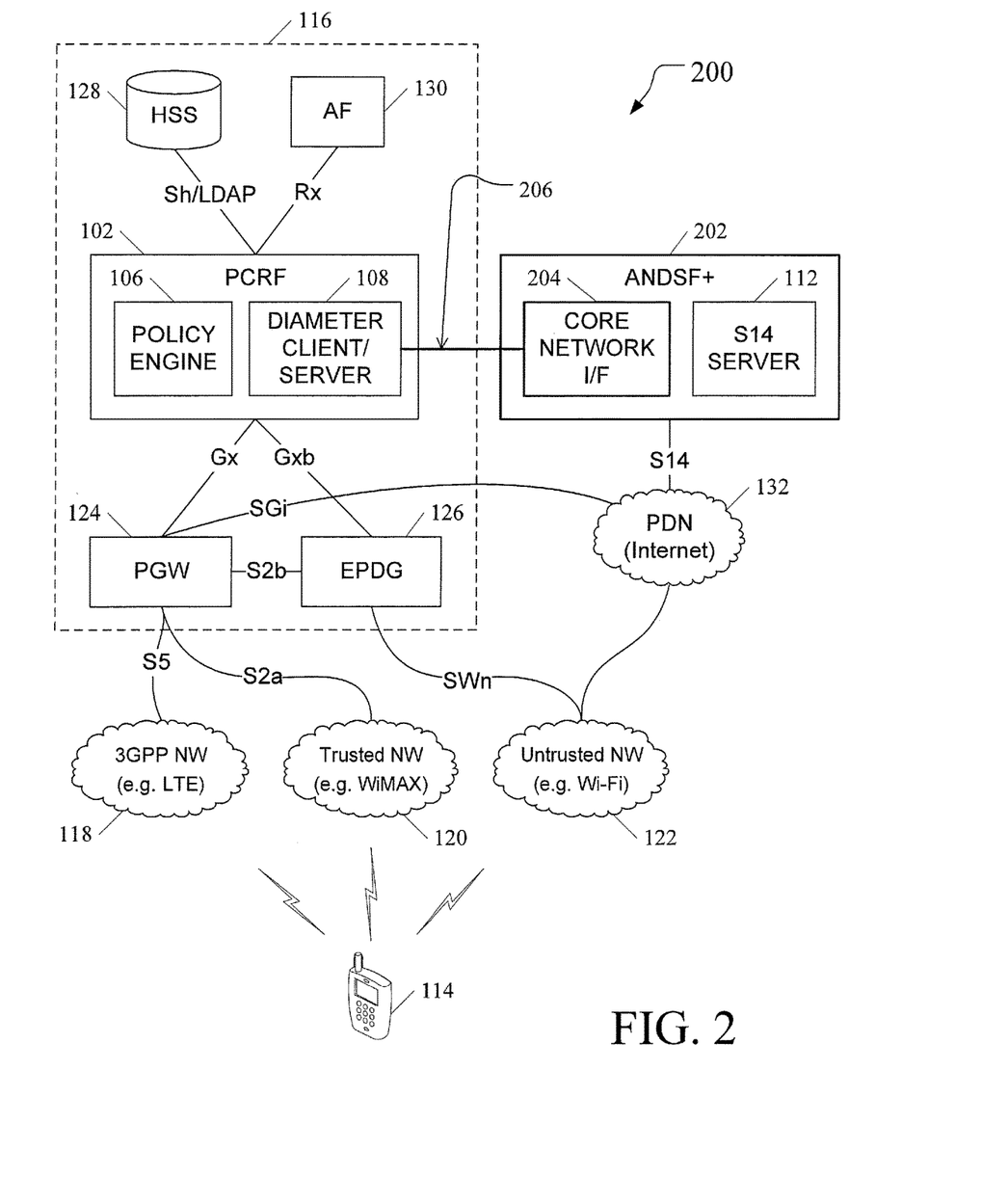
FIG. 2 is a block diagram illustrating an exemplary system for access network discovery and selection according to an embodiment of the subject matter described herein.

FIG. 2 is a block diagram illustrating an exemplary system for access network discovery and selection according to an embodiment of the subject matter described herein. The network 200 illustrated in FIG. 2 is identical to network 100 shown in FIG. 1, except that network 200 includes an enhanced access network discovery and selection function, ANDSF 202.

ANDSF 202 includes a core network interface 204, which allows it to communicate with nodes in the core network 116, including but not limited to PCRF 102, HSS 128, AF 130, gateways 124 and 126, as well as traffic detection functions (TDFs) not shown. In the embodiment illustrated in FIG. 2, for example, ANDSF 202 communicates with PCRF 102. This allows enhanced ANDSF 202 to use policy information when performing access network discovery and selection. ANDSF 202 still includes S14 server 112, which allows ANDSF 202 to communicate with UEs, such as UE 114, using the S14 protocol.

In the embodiment illustrated in FIG. 2, ANDSF 202 may communicate with PCRF 102 via connection 206. In one embodiment, core network interface 204 may support the Diameter protocol, in which case connection 206 may be a Diameter connection and core network interface 204 may be a Diameter interface, which may be part of a Diameter server and/or client. Alternatively, ANDSF 202 may communicate with PCRF 102 and other nodes within core network 116 via other protocols, such as HTTP, etc.

Because ANDSF 202 can communicate directly with PCRF 102, ANDSF 202 may defer to PCRF 102 for all policy decisions. Unlike conventional ANDSF 104 in FIG. 1, which included policy engine 110, in the embodiment illustrated in FIG. 2, ANDSF 202 does not include a policy engine. In alternative embodiments, however, ANDSF 202 may include both a policy engine 110 and a core network interface 204.

ANDSF 202 may receive information from nodes in core network 116, which ANDSF 202 may use while selecting an access network and identifying the selected access network to UE 114. ANDSF 202 may receive such information from a node in response to a request sent from ANDSF 202 to the node, the node may send this information unilaterally, or the node may send this information in response to a network event or request from a node other than ANDSF 202. n the embodiment illustrated in FIG. 2, for example, ANDSF 202 may receive and implement policy information from PCRF 102, including access policies, mobility policies, routing policies, offload policies, and traffic prioritization policies. PCRF 102 may provide information about the existence or status of available core and/or access networks.

In one embodiment, ANDSF 202 may send information to nodes in the core network. This information includes, but is not limited to, a request for information from the node, an acknowledgement of information received from the node, an indication of success or failure at performing a function requested by the node, an indication of activity or change of activity by UE 114, and an indication of status or change of status of UE 114. In the embodiment illustrated in FIG. 2, for example, information that ANDSF 202 may send to PCRF 102 may also include an indication of success or failure at implementing a policy.

In one embodiment, ANDSF 202 may operate as a conduit by which UE 114 and PCRF 102 may communicate. For example, ANDSF 202 may operate more like a gateway, which PCRFs conventionally communicate with. UEs conventionally operate under the control of policy and charging enforcement functions (PCEFs) and don't directly interact with PCRFs. By providing a communication path through ANDSF 202, call offloading decisions can be made based on information not available to all of the parties in conventional networks. For example, PCRF 102 may provide ANDSF 202 with information indicating whether one access network is cheaper than another, as well as information about the subscriber, such as whether the subscriber is a top-tier subscriber who may be offloaded to a faster but more expensive access network, versus a bottom-tier subscriber who may be offloaded to a cheaper but slower access network.

Likewise, UE 114 may use ANDSF 202 to communicate to PCRF 102 information that PCRF 102 may find valuable, such as notification that UE 114 is starting a high-bandwidth application; PCRF 102 may then make sure to push policies down to the necessary gateway, such as PGW 124 or ePDG 126, for example, to ensure the required bandwidth for the application is available through the network to the device, or to apply throttling policies if abuse is detected. Thus, ANDSF 202 provides for a UE-centric approach to services versus the traditional network-centric approach.

ANDSF 202 may use its core network interface 204 to communicate with other nodes in the core network that conventional ANDSFs do not have access to as well. In the embodiment illustrated in FIG. 2, for example, ANDSF 202 may communicate with subscriber profile repositories, such as HSS 128, which allows ANDSF 202 to access subscriber data, including profile information, subscriber tier or service level (e.g., gold/bronze/silver), QoS data, data plan limits, current usage and quotas, and other subscriber information. ANDSF 202 can communicate with application functions, such as AF 130, which allows ANDSF 202 to trigger applications in response to access network connection events. ANDSF 202 can communicate with gateways, such as PGW 124 and ePDG 126, and traffic detection functions, which allow finer-grained access control than can be implemented by conventional ANDSF 104.

Figure 3:
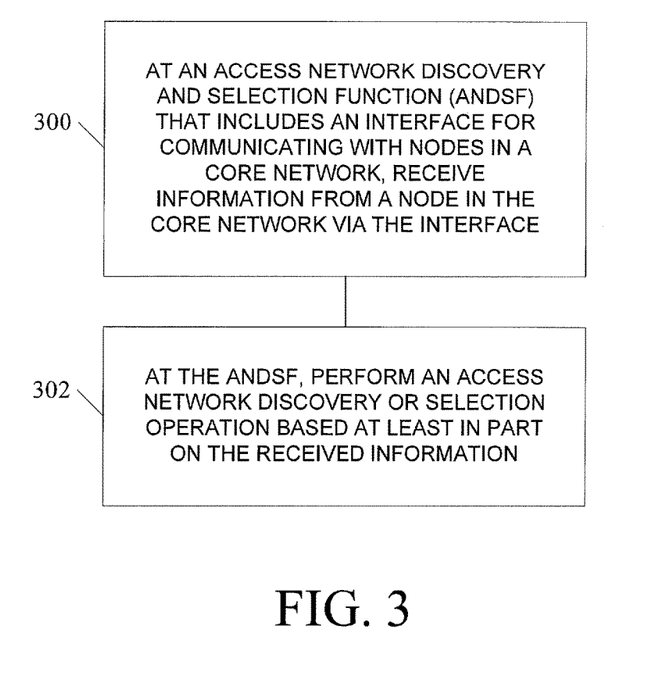
FIG. 3 is a flow chart illustrating an exemplary process for access network discovery and selection according to an embodiment of the subject matter described herein.

FIG. 3 is a flow chart illustrating an exemplary process for access network discovery and selection according to an embodiment of the subject matter described herein. This process will be described with reference to FIGS. 2 and 3.

At step 300 in FIG. 3, an ANDSF that includes an interface for communicating with nodes in a core network receives information from a node in the core network via that interface. In the embodiment illustrated in FIG. 2, ANDSF 202 may receive information from PCRF 102, which ANDSF 202 receives via its core network interface 204. In one embodiment, core network interface 204 may be a Diameter server which communicates Diameter messages to and from Diameter client 108 within PCRF 102. PCRF 102 may send policy information to ANDSF 202 unilaterally, in response to a request for such information from ANDSF 202, and/or in response to a request or information from another node in the system.

At step 302, the ANDSF performs an access network discovery or selection operation based at least in part on the received information. In response to receiving the policy information from PCRF 102, ANDSF 202 may implement a policy based on the received policy information. For example: ANDSF 202 may implement an access policy, mobility policy, routing policy, or other type of policy; ANDSF 202 may perform an off-load, e.g., instruct UE 114 to change from one access network to another access network; ANDSF 202 may use the received information to prioritize traffic; and ANDSF 202 may provide information about a core network or an access network.

In one embodiment, ANDSF 202 may send information to nodes in the core network as well. This information can include, but is not limited to, a request for information, acknowledgement of information received, an indication of activity or change of activity by the UE, an indication of status or a change of status of the UE, and an indication of success or failure at performing a function requested by the node. In the embodiment illustrated in FIG. 2, for example, ANDSF 202 may send information to PCRF 102, including, but not limited to, an indication of success or failure at implementing a policy.

Having a core network interface 204 to communicate with nodes in core network 116 gives ANDSF 202 the ability to make more intelligent decisions. For example, ANDSF 202 can consider policy information received from PCRF 102 when:

identifying to the UE a first access network by which the UE can connect to the core network or to another network, identifying to the UE a second or alternate access network by which the UE can connect to the core network or to another network, instructing the UE to connect to or disconnect from the core network or other network via an identified access network, instructing the UE to change from using one access network to connect to the core network to using another access network to connect to the core network, and instructing the UE to change from using one access network to connect to the core network to using another access network to connect to the network other than the core network.

Core network interface 204 gives ANDSF 202 the ability to use subscriber data from HSS 128, to trigger applications hosted by AF 130, and control access via gateways 124 and 126. Other benefits include:

Holistic policy implementation. It is no longer necessary to write network policies at PCRF 102 and non-3GPP access polices at ANDSF 202. Instead, PCRF 102 may store policies for multiple network types.

Simplified management. Existing policy provisioning and management interfaces may be used via a configuration management platform, or CMP.

Dynamic Offload Policies. Makes existing PCRF interfaces available for Wi-Fi offload polices, including:
Gx/Gxb/Sd: Session information from gateways and TDFs
Sh/LDAP: Subscriber profile, quota, and entitlement data from HSS/SPR/UDR
Rx: Application information from Internet protocol (IP) multimedia systems (IMS) and other the top (OTT) systems
Sy: Monetary threshold indications from online charging systems (OCS).

Yet another benefit provided by ANDSF 202 is that it provides PCRF 102 with direct access to the mobile device. In one embodiment, ANDSF 202 becomes a mobile policy gateway, or MPG, acting as a mediation platform between PCRF 102 and UEs on the network, such as UE 114. When ANDSF 202 acts as an MPG, this allows policy to treat the mobile devices as a combination enforcement point and application function. For example, UE 114 may receive offload rules from PCRF 102. In one embodiment, the rules sent to UE 114 may differ depending on the subscriber's tier. Likewise UE 114 may send valuable information to PCRF 102. For example, UE 114 may send an "application started" indication when the user starts an application hosted by UE 114.

One difference between core network policy and mobile policy is that the mobile device must be treated as an untrusted device: messages from the mobile device may be counterfeit, and messages to the mobile device may be ignored or not honored. Applying policy on the mobile device via ANDSF 202 acting as a mobile policy gateway can remove or reduce the motivation to hack the device. Policy on the mobile allows the operator to improve the user's experience, by moving the device to the best available network based on network conditions and performance, by moving data usage to off-peak times so that the subscriber can save money by avoiding surcharges for usage during peak hours, and by selectively blocking or firewalling mobile applications that are misbehaving.

The use of ANDSF 202 as a mobile policy gateway allows the operator to offload UEs to Wi-Fi only when necessary, as subscribers on Wi-Fi do not generate revenue. ANDSF 202 can provide real-time dynamic capabilities such as providing preferential LTE network access to higher-tier subscribers, providing a quota-based offload (i.e., tie the offload decision to available user quotas), prioritizing offload of lower-revenue subscribers (e.g., consumer UEs before corporate UEs, or mobile to mobile (M2M) devices before telephones.) Other benefits of ANDSF 202 as MPG include the ability to offload based on application indications from the OTT provider (e.g., the start of streaming video), offload out-of-credit prepaid customers (as an alternative to simply cutting them off, for example), and TDF-based offload (e.g., don't offload customers using content filters, content delivery or distribution networks, or cache.) Finally, ANDSF 202 can perform smart offload, e.g., it can send offload rules to UE 114 that take network conditions into account, such as received signal strength indication (RSSI) or global positioning system (GPS) location information.

By pushing policy to the mobile device, ANDSF 202 provides the ability to apply policies that conventional networks cannot implement. For example, some applications cannot be detected in the network. Even deep packet inspection (DPI) cannot identify all applications, especially if data is encrypted. OTT providers may not cooperate in providing application information. Application of policy by the UE itself can detect application launches and other actions at the UE. Two models that utilize usage data include a PCEF model, where the PCRF sends the UE rules that employ usage data to make decisions (e.g., only offload if application X is running) and an AF model, where the mobile policy client sends an application message to the PCRF to trigger policies (e.g., increase bandwidth if application X is running.) In addition, a PCRF can use application execution data that is sent directly from the mobile device and that is not otherwise available to the network, such as application start/stop events, application event information (e.g., events tied to specific user actions in an application, such as video play/pause/seek), and event or threshold indications (e.g., event X happened 4 times today.)

Policy on the mobile also allows for interactive, dynamic upsell. There are at least two types of traditional upsell mechanisms: after-the-fact marketing, such as email and direct mail, and real-time marketing, such as portal redirect, and SMS. After-the-fact marketing is not as effective as real-time marketing, but real-time marketing takes the user out of the experience, and requires some kind of redirect to be done in the network. Policy on the mobile provides a more natural and seamless interface for upsell. For example, operators can offer upsell products to users within the application environment and with minimal disruption of the user experience. Operators can also present branded interfaces for specific applications.

ANDSF 202 can also control application time and place shifting. For example, operators can offer incentives to subscribers for "shifting" usage of high bandwidth applications. This includes both time shifting (e.g., delay running applications for a certain amount of time) and place shifting (e.g., only run applications inside/outside of a certain area.) A mobile policy client can automatically restart applications (or alert user to do so) once the blackout period ends.

By pushing policy on the mobile, ANDSF 202 can provide application firewalling at the UE. Badly behaved mobile applications can cause serious network issues for operators, including causing serious bandwidth shortages and in some cases, even taking down the signaling network. Policy on the mobile allows operators to quickly create and deploy policies that throttle or firewall individual applications at the mobile device. This gives operators an effective stopgap solution until application providers can push out a fix.

Yet another advantage of ANDSF 202 is that is allows enhanced messaging at the mobile. Messaging at the mobile enables policy to interact with subscribers in real-time. For example, offers made via real-time messaging have much higher uptake rates than those made via after-the-fact messaging (like email). Traditional messaging at the mobile is disruptive and reduces the user's quality of experience. For example, SMS is text-based messaging only—no graphical interface, and requires the user to suspend or exit application to retrieve and respond to message. Message redirect requires a browser-based interface, which is disruptive for non-browser applications. Plus, redirects can break browser navigation (e.g. back button). A mobile policy client can present a more seamless interface to users. A mobile policy client can support both blocking and non-blocking messages (blocking messages can prevent application execution until a decision is made.) This allows operators to create customized messaging interfaces. Branding or customizing the UI makes the experience more seamless and reduces confusion.

In one embodiment, a system for access network discovery and selection includes an access network discovery and selection function (ANDSF) network element for identifying to a user equipment (UE) an access network through which the UE can connect to a core network, the ANDSF including an interface for communicating with nodes in a core network, wherein the ANDSF is configured to receive information from a node in the core network via the interface and perform an access network discovery or selection operation based at least in part on the received information.

The interface for communicating with nodes in a core network may be a Diameter interface for sending and receiving Diameter protocol messages, or an interface for sending and receiving hypertext transport protocol (HTTP) messages. The ANDSF may be configured to send information to the node in the core network. This information may include, but is not limited to, a request for information from the node, an acknowledgement of information received from the node, an indication of success or failure at performing a function requested by the node, an indication of activity or change of activity by the UE, and an indication of status or change of status of the UE. In one embodiment, the ANDSF receives information from the node in the core network in response to sending a request to the node in the core network. The ANDSF may be configured to send or receive information a policy and charging rules function (PCRF), a home subscriber server (HSS), an application function (AF), a traffic detection function (TDF), a gateway (GW), or other nodes in the core network.

In one embodiment, the ANDSF implements a policy in response to receiving information from a PCRF. Implementing a policy can include, but is not limited to, implementing an access policy, implementing a mobility policy, implementing a routing policy, performing an off-load, prioritizing traffic, providing information about a core network, and providing information about an access network. For example, the ANDSF may send to the PCRF information that includes indication of success or failure at implementing a policy.

The ANDSF may be configured to perform operations such as identifying to the UE a first access network by which the UE can connect to the core network, identifying to the UE a second access network by which the UE can connect to the core network, instructing the UE to connect to the core network via an identified access network, instructing the UE to terminate an existing connection to the core network via an identified access network, and instructing the UE to change from using one access network to connect to the core network to using another access network to connect to the core network. Other examples of performing an access network discovery or selection operation include identifying to the UE a first access network by which the UE can connect to a network other than the core network, identifying to the UE a second access network by which the UE can connect to the network other than the core network, instructing the UE to connect to the network other than the core network via an identified access network, instructing the UE to terminate an existing connection to the network other than the core network via an identified access network, and instructing the UE to change from using one access network to connect to the core network to using another access network to connect to the network other than the core network.

In one embodiment, a method for access network discovery and selection includes, at an access network discovery and selection function (ANDSF) for identifying to a user equipment (UE) an access network through which the UE can connect to a core network, the ANDSF including an interface for communicating with nodes in a core network, receiving information from a node in the core network via the interface and performing an access network discovery or selection function based at least in part on the received information. Receiving information from a node in the core network can include, but is not limited to, receiving Diameter protocol messages and receiving hypertext transport protocol (HTTP) messages.

The method can include sending information to a node in the core network. Examples of such information include, but are not limited to, a request for information from the node, an acknowledgement of information received from the node, an indication of success or failure at performing a function requested by the node, an indication of activity or change of activity by the UE, and an indication of status or change of status of the UE.

The method can include receiving information from the node in the core network in response to sending a request to the node in the core network. Information can be received from nodes in the core network including, but not limited to, a policy and charging rules function (PCRF), a home subscriber server (HSS), an application function (AF), a traffic detection function (TDF), and a gateway (GW).

The method can include receiving information from a PCRF and implementing a policy in response to receiving the information from the PCRF. Implementing a policy can include, but is not limited to, implementing an access policy, implementing a mobility policy, implementing a routing policy, performing an off-load, prioritizing traffic, providing information about a core network, and providing information about an access network. The method can include sending information to the PCRF. Information that may be sent to the PCRF may include an indication of success or failure at implementing a policy.

In one embodiment, performing an access network discovery or selection operation can include, but is not limited to, identifying to the UE a first access network by which the UE can connect to the core network, identifying to the UE a second access network by which the UE can connect to the core network, instructing the UE to connect to the core network via an identified access network, instructing the UE to terminate an existing connection to the core network via an identified access network, and instructing the UE to change from using one access network to connect to the core network to using another access network to connect to the core network. Other examples of performing an access network discovery or selection operation include identifying to the UE a first access network by which the UE can connect to a network other than the core network, identifying to the UE a second access network by which the UE can connect to the network other than the core network, instructing the UE to connect to the network other than the core network via an identified access network, instructing the UE to terminate an existing connection to the network other than the core network via an identified access network, and instructing the UE to change from using one access network to connect to the core network to using another access network to connect to the network other than the core network.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for access network discovery and selection, the system comprising:
   an access network discovery and selection function (ANDSF) network element for identifying to a user equipment (UE) an access network through which the UE can connect to a core network,
   wherein the ANDSF network element includes an interface for communicating with a policy and charging rules function (PCRF) associated with the core network, and wherein the ANDSF is configured to use the interface for communicating with the PCRF to operate as a conduit by which the UE and the PCRF may communicate;
   wherein the ANDSF network element is configured to provide a dynamic offload policy from the PCRF to the UE, and wherein the ANDSF network element is configured to receive, while operating as the conduit by which the UE and the PCRF may communicate, an indicator destined for the PCRF from the UE and send the indicator to the PCRF using the interface for communicating with the PCRF, and wherein the indicator from the UE comprises an indication of activity or change of activity by the UE or an indication of status or change of status of the UE;
   wherein the ANDSF network element is configured to communicate with an application function (AF) node using the interface for communicating with the PCRF and to trigger applications of the AF node in response to access network connection events.

2. The system of claim 1 wherein the ANDSF receives information from the PCRF.

3. The system of claim 2 wherein the ANDSF identifies to the UE an access network based on information that the ANDSF receives from the PCRF.

4. The system of claim 3 wherein the UE uses the access network that was identified to the UE by the ANDSF.

5. The system of claim 2 wherein the ANDSF implements a policy in response to receiving the information from the PCRF.

6. The system of claim 5 wherein implementing a policy comprises applying policy on the UE via the ANDSF acting as a mobile policy gateway.

7. The system of claim 6 wherein applying policy on the UE comprises moving the UE to the best available network based on network conditions and performance, moving data usage to off-peak times, and selectively blocking or firewalling mobile applications that are misbehaving.

8. The system of claim 1 wherein the indicator from the UE is a notification that the UE is starting a high-bandwidth application, and wherein sending the indicator from the UE to the PCRF causes the PCRF to push one or more policies to a gateway to ensure that a required bandwidth for the high-bandwidth application is available to the UE.

9. The system of claim 1 wherein the ANDSF network element is configured to communicate with a traffic detection function (TDF) node using the using the interface for communicating with the PCRF and to perform TDF-based offloads by determining not to offload customers using content filters, content delivery or distribution networks, or caches.

10. The system of claim 1 wherein the indicator from the UE comprises application event information including events tied to specific user actions in an application, and wherein the events tied to specific user actions comprise video play, pause, and seek events.

11. A method for access network discovery and selection, the method comprising:
   receiving, at an access network discovery and selection function (ANDSF) network element for identifying to a user equipment (UE) an access network through which the UE can connect to a core network, information from a policy and charging rules function (PCRF), wherein the information comprises a dynamic offload policy, and wherein the ANDSF is configured to use the interface for communicating with the PCRF to operate as a conduit by which the UE and the PCRF may communicate;
   performing a function based at least in part on the information received from the PCRF, including providing the dynamic offload policy to the UE;
   receiving, while operating as the conduit by which the UE and the PCRF may communicate, an indicator destined for the PCRF from the UE and sending the indicator to the PCRF using the interface for communicating with the PCRF, wherein the indicator from the UE comprises an indication of activity or change of activity by the UE or an indication of status or change of status of the UE; and
   communicating, at the ANDSF network element, with an application function (AF) node using the interface for communicating with the PCRF and triggering applications of the AF node in response to access network connection events.

12. The method of claim 11 wherein performing the function comprises identifying an access network to the UE.

13. The method of claim 12 comprising using, by the UE, the access network that was identified to the UE by the ANDSF.

14. The method of claim 11 wherein performing the function comprises implementing a policy.

15. The method of claim 14 wherein implementing a policy comprises applying policy on the UE via the ANDSF acting as a mobile policy gateway.

16. The method of claim 15 wherein applying policy on the UE comprises moving the UE to the best available network based on network conditions and performance, moving data usage to off-peak times, and selectively blocking or firewalling mobile applications that are misbehaving.

17. The method of claim 11 wherein receiving information from a PCRF comprises receiving information via at least one of a Diameter protocol and a hypertext transport (HTTP) protocol.

18. The method of claim 11 wherein the indicator from the UE is a notification that the UE is starting a high-bandwidth application, and wherein sending the indicator from the UE to the PCRF causes the PCRF to push one or more policies to a gateway to ensure that a required bandwidth for the high-bandwidth application is available to the UE.

19. The method of claim 11 comprising communicating with a traffic detection function (TDF) node using the using the interface for communicating with the PCRF and performing TDF-based offloads by determining not to offload customers using content filters, content delivery or distribution networks, or caches.

20. The method of claim 11 wherein the indicator from the UE comprises application event information including events tied to specific user actions in an application, and wherein the events tied to specific user actions comprise video play, pause, and seek events.

21. A non-transitory computer readable medium having stored thereon executable instructions that when executed by the processor of a computer control the computer to perform steps comprising:
- receiving, at an access network discovery and selection function (ANDSF) network element for identifying to a user equipment (UE) an access network through which the UE can connect to a core network, information from a policy and charging rules function (PCRF), wherein the information comprises a dynamic offload policy, and wherein the ANDSF is configured to use the interface for communicating with the PCRF to operate as a conduit by which the UE and the PCRF may communicate;
- performing a function based at least in part on the information received from the PCRF, including providing the dynamic offload policy to the UE;
- receiving, while operating as the conduit by which the UE and the PCRF may communicate, an indicator destined for the PCRF from the UE and sending the indicator to the PCRF using the interface for communicating with the PCRF, wherein the indicator from the UE comprises an indication of activity or change of activity by the UE or an indication of status or change of status of the UE; and
- communicating, at the ANDSF network element, with an application function (AF) node using the interface for communicating with the PCRF and triggering applications of the AF node in response to access network connection events.

* * * * *